US009621297B2

(12) United States Patent
Cavaliere et al.

(10) Patent No.: US 9,621,297 B2
(45) Date of Patent: Apr. 11, 2017

(54) OPTICAL COMMUNICATION SYSTEM, METHOD OF BI-DIRECTIONAL COMMUNICATION AND METHOD OF OPERATING A NETWORK ELEMENT

(71) Applicant: Telefonaktiebolaget L M Ericsson (publ), Stockholm (SE)

(72) Inventors: Fabio Cavaliere, Vecchiano (IT); Luca Poti, Pisa (IT); Gianluca Meloni, Livorno (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 10 days.

(21) Appl. No.: 14/433,853

(22) PCT Filed: Oct. 9, 2012

(86) PCT No.: PCT/EP2012/069954
§ 371 (c)(1),
(2) Date: Apr. 6, 2015

(87) PCT Pub. No.: WO2014/056526
PCT Pub. Date: Apr. 17, 2014

(65) Prior Publication Data
US 2015/0270920 A1 Sep. 24, 2015

(51) Int. Cl.
*H04J 14/04* (2006.01)
*H04B 10/25* (2013.01)
*H04J 14/02* (2006.01)

(52) U.S. Cl.
CPC .......... *H04J 14/04* (2013.01); *H04B 10/2503* (2013.01); *H04J 14/0232* (2013.01)

(58) Field of Classification Search
CPC .......... H04J 14/04; H04J 14/02; H04J 14/021; H04J 14/0232; H04B 10/2581
(Continued)

(56) References Cited

U.S. PATENT DOCUMENTS 5,651,080 A * 7/1997 Chu .................. G02B 6/14
385/24
8,891,964 B2 * 11/2014 Cvijetic .................. H04J 14/04
398/142
(Continued)

FOREIGN PATENT DOCUMENTS

WO 2010/142285 A2 12/2010

OTHER PUBLICATIONS

PCT International Search Report, mailed Jun. 19, 2013, in connection with International Application No. PCT/EP2012/069954, all pages.
(Continued)

*Primary Examiner* — Hanh Phan
(74) *Attorney, Agent, or Firm* — Leffler Intellectual Property Law, PLLC

(57) ABSTRACT

An optical communication system comprising an optical link comprising an optical fiber, a first network element coupled to a first end of the optical link and a second network element coupled to a second end of the optical link. The first network element is configured to generate a first optical signal for transmission to the second network element, the first optical signal having a first propagation mode corresponding to a first guided mode of the optical fiber. The second network element is configured to generate a second optical signal for transmission to the first network element, the second optical signal having a second propagation mode, different to the first propagation mode, corresponding to a second guided mode of the optical fiber.

18 Claims, 12 Drawing Sheets

(58) Field of Classification Search
USPC ..... 398/44, 43, 141, 79, 158, 159, 135, 136, 398/137, 138, 139; 385/24, 123, 124, 385/126, 127, 128
See application file for complete search history.

(56) References Cited

U.S. PATENT DOCUMENTS

| | | |
|---|---|---|
| 2010/0329671 A1 | 12/2010 | Essiambre et al. |
| 2012/0213519 A1* | 8/2012 | Lee ................ H04B 10/506 398/72 |
| 2013/0071115 A1* | 3/2013 | Bennett ............ H04B 10/2581 398/44 |
| 2014/0153922 A1* | 6/2014 | Ryf ................. H04B 10/2581 398/44 |

OTHER PUBLICATIONS

Bai, N. et al. "Mode-division multiplexed transmission with inline few-mode fiber amplifier" Optics Express, vol. 20, No. 3, Jan. 30, 2012, pp. 2668, XP55048747, ISSN: 1094-4087.
Uematsu, T. et al. "Design of a Compact Two-Mode Multi/Demultiplexer Consisting of Multimode Interference Waveguides and a Wavelength-Insensitive Phase Shifter for Mode-Division Multiplexing Transmission" Journal of Lightwave Technology, vol. 30, No. 15, Aug. 1, 2012, pp. 2421-2426.

* cited by examiner

OPTICAL COMMUNICATION SYSTEM, METHOD OF BI-DIRECTIONAL COMMUNICATION AND METHOD OF OPERATING A NETWORK ELEMENT

TECHNICAL FIELD

The invention relates to an optical communication system, a method of bi-directional communication in an optical communication system, and a method of operating a network element in an optical communication system.

BACKGROUND

Wavelength Division Multiplexing is a well known method of increasing fibre capacity by allocating different client signals to different optical carrier wavelengths. A special class of fibre access communication system exploits bidirectional communication, e.g. between end user and Central Office, on a single fibre and using the same wavelength in both directions in order to maximize the carried capacity. This type of transmission is generally referred as wavelength reuse and needs special kinds of modulation formats to mitigate cross-talk between the two propagation directions. The use of special modulation formats (e.g. IRZ/RZ) can mitigate but not cancel out the cross-talk terms due to the optical reflections along an optical fibre link and residual downstream modulation on the upstream traffic.

An alternative way to increase fibre capacity is to exploit different propagation modes. Multi-mode fibres have been on the market for a long time but optical signals propagating in multi-mode fibre suffer inter-modal dispersion and intensity noise, which cause a significant transmission penalty, and they have therefore never really been exploited for optical communications over long distances. Recently however, mode-division multiplexed, MDM, wavelength division multiplexed, WDM, transmission has been reported, e.g. by N. Bai et al 'Mode-division multiplexed transmission with inline few-mode fiber amplifier', Optics Express, Vol. 30, No. 2, 30 Jan. 2012.

SUMMARY

It is an object to provide an improved an optical communication system. It is a further object to provide an improved method of bi-directional communication in an optical communication system. It is a further object to provide an improved method of operating a network element in an optical communication system.

A first aspect of the invention provides an optical communication system comprising an optical link, a first network element and a second network element. The optical link comprises an optical fibre. The first network element is coupled to a first end of the optical link. The first network element is configured to generate a first optical signal for transmission to the second network element. The first optical signal has a first propagation mode corresponding to a first guided mode of the optical fibre. The second network element is coupled to a second end of the optical link. The second network element is configured to generate a second optical signal for transmission to the first network element. The second optical signal has a second propagation mode, different to the first propagation mode, corresponding to a second guided mode of the optical fibre.

The invention provides a bidirectional fibre system in which different propagation modes are used for the two opposite propagation directions in the same fibre. Due to the different spatial distribution of the modes in the fibre core, this may increase the tolerance of the optical communication system to optical reflections.

In an embodiment, the first optical signal and the second optical signal have a first wavelength. Wavelength reuse may increase the capacity of the optical communication system due to the same wavelength being used at each mode; the capacity increase factor with respect to conventional optical systems equals the number of supported modes.

In an embodiment, the optical communication system comprises a plurality of said second network elements each coupled to the second end of the optical link. The first network element is configured to generate first optical signals at each of a plurality of different wavelengths for transmission to respective ones of the second network elements. Each second network element is configured to generate a respective second optical signal at a respective one of the wavelengths. At each wavelength the first optical signal and the second optical signal have different propagation modes corresponding to respective different guided modes of the fibre. WDM combined with wavelength reuse and MDM may increase the capacity of the optical communication system while reducing the cross-talk terms due to at least one of optical reflections and residual modulation.

In an embodiment, the first optical signals each have a first propagation mode and the second optical signals each have a second propagation mode, different to the first propagation mode. WDM combined with wavelength reuse and MDM at each wavelength may increase the capacity of the optical communication system and may reduce the cross-talk terms due to at least one of optical reflections and residual modulation. The capacity increase factor with respect to conventional WDM systems may equal the number of supported modes.

In an embodiment, the first network element is configured to generate at least one third optical signal for transmission to at least one second network element. The third optical signal has a third propagation mode, different to the first and second propagation modes, corresponding to a third guided mode of the optical fibre. Using a third mode at at least one wavelength may further increase the capacity of the communication system.

In an embodiment, the first network element is configured to generate a third optical signal at each of the plurality of wavelengths for transmission to respective ones of the second network elements. The third optical signals have the third propagation mode. Using the third mode at each wavelength may further increase the capacity of the communication system.

In an embodiment, the optical fibre is a few-mode fibre. This may enable a small number of modes to propagate within the fibre limiting inter-modal dispersion and intensity noise effects which arise using multi-mode fibre. The optical fibre may support a few guided modes within the optical communication C-band or L-band.

In an embodiment, the optical fibre is a single-mode fibre and each wavelength is below a cut-off wavelength of the single-mode fibre such that 2 or 3 guided modes are excited within the single-mode fibre at each wavelength. This may enable existing installed single-mode fibre to be used.

In an embodiment, the single-mode fibre is single-mode fibre as defined in ITU-T Recommendations series G.65x. This may enable existing installed single-mode fibre to be used at wavelengths outside the optical communication C-band or L-band.

In an embodiment, the optical communication system is a fibre access optical communication system. In an embodiment, the optical communication system is a passive optical network.

In an embodiment, the first optical signal is a downstream optical signal and the second optical signal is an upstream optical signal. In an embodiment, the third optical signal is a broadcast channel. This may enable a single wavelength to be used for downstream communication, upstream communication and a broadcast channel, thereby increasing the capacity of the communication system as compared to known optical communication systems employing wavelength re-use.

In an embodiment, the optical communication system is a mobile backhaul optical communication system.

A second aspect of the invention provides a method of bidirectional communication in an optical communication system. The optical communication system comprises an optical link comprising an optical fibre, a first network element coupled to a first end of the optical link and a second network element coupled to a second end of the optical link. The method comprises generating a first optical signal at the first network element and transmitting the first optical signal across the optical link to the second network element. The first optical signal has a first propagation mode corresponding to a first guided mode of the optical fibre. The method comprises generating a second optical signal at the second network element and transmitting the second optical signal across the optical link to the first network element. The second optical signal has a second propagation mode, different to the first propagation mode, corresponding to a second guided mode of the optical fibre.

The method enables bidirectional communication in which different propagation modes are used for the two opposite propagation directions in the same fibre. Due to the different spatial distribution of the modes in the fibre core, the method may increase the tolerance of the optical communication system to optical reflections.

In an embodiment, the first optical signal and the second optical signal have a first wavelength. Wavelength reuse may increase the capacity of the bidirectional communication due to the same wavelength being used at each mode; the capacity increase factor with respect to conventional bidirectional optical communication equals the number of supported modes.

In an embodiment, the optical communication system comprises a plurality of second network elements each coupled to the second end of the optical link. The method comprises generating a first optical signal at each of a plurality of different wavelengths and transmitting each first optical signal across the optical link to respective ones of the second network elements. The method comprises generating a respective second optical signal at at least one of the second network elements and transmitting the at least one second optical signal across the optical link to the first network element. The second optical signal generated at each second network element has a respective different one of the wavelengths. At each wavelength the first optical signal and the second optical signal have different propagation modes corresponding to respective different guided modes of the fibre. WDM combined with wavelength reuse and MDM may increase the capacity of the bidirectional communication while reducing the cross-talk terms due to at least one of optical reflections and residual modulation.

In an embodiment, the first optical signals each have a first propagation mode and the second optical signals each have a second propagation mode, different to the first propagation mode. WDM combined with wavelength reuse and MDM at each wavelength may increase the capacity of the bidirectional communication and may reduce the cross-talk terms due to at least one of optical reflections and residual modulation. The capacity increase factor with respect to conventional WDM bidirectional communication may equal the number of supported modes.

In an embodiment, the method comprises generating at least one third optical signal at the first network element and transmitting the at least one third optical signal to a respective second network element. The third optical signal has a third propagation mode, different to the first and second propagation modes, corresponding to a third guided mode of the optical fibre. Using a third mode at at least one wavelength may further increase the capacity of the bidirectional communication.

In an embodiment, the method comprises generating a third optical signal at each of the plurality of wavelengths at the first network element and transmitting the third optical signals to respective ones of the second network elements. The third optical signals have the third propagation mode. Using the third mode at each wavelength may further increase the capacity of the bidirectional communication.

In an embodiment, the optical communication system is a fibre access optical communication system. In an embodiment, the optical communication system is a passive optical network.

In an embodiment, the first optical signal is a downstream optical signal and the second optical signal is an upstream optical signal. In an embodiment, the third optical signal is a broadcast channel. This may enable a single wavelength to be used for downstream communication, upstream communication and a broadcast channel, thereby increasing the capacity of the bidirectional communication as compared to known optical communication systems employing wavelength re-use.

In an embodiment, the optical communication system is a mobile backhaul optical communication system.

A third aspect of the invention provides a method of operating a network element in an optical communication system. The optical communication system comprises an optical link comprising an optical fibre, a first network element coupled to a first end of the optical link and a second network element coupled to a second end of the optical link. The method comprises generating and transmitting a first optical signal having a first propagation mode corresponding to a first guided mode of the optical fibre. The method comprises receiving a second optical signal having a second propagation mode, different to the first propagation mode, corresponding to a second guided mode of the optical fibre.

The method enables a network element to operate with different propagation modes for the two opposite propagation directions. Due to the different spatial distribution of the modes in a fibre core, the method may increase the tolerance to optical reflections of an optical communication system incorporating the network element.

In an embodiment, the first optical signal and the second optical signal have a first wavelength. Wavelength reuse may increase the capacity of the an optical communication system incorporating the network element due to the same wavelength being used at each mode; the capacity increase factor with respect to conventional optical communication systems equals the number of supported modes.

In an embodiment, the optical communication system comprises a plurality of second network elements each coupled to the second end of the optical link. The method comprises generating and transmitting a first optical signal at each of a plurality of different wavelengths. The method comprises receiving at least one second optical signal having a respective one of the wavelengths. At each wavelength the first optical signal and the second optical signal have different propagation modes corresponding to respective different guided modes of the fibre. WDM combined with wavelength reuse and MDM may increase the capacity of an optical communication system incorporating the network element while reducing the cross-talk terms due to at least one of optical reflections and residual modulation.

In an embodiment, the first optical signals each have the first propagation mode and the at least one second optical signal has the second propagation mode. WDM combined with wavelength reuse and MDM at each wavelength may increase the capacity of an optical communication system incorporating the network element and may reduce the cross-talk terms due to at least one of optical reflections and residual modulation. The capacity increase factor with respect to conventional WDM optical communication systems may equal the number of supported modes.

In an embodiment, the method comprises generating and transmitting at least one third optical signal. The at least one third optical signal has a third propagation mode, different to the first and second propagation modes, corresponding to a third guided mode of the optical fibre. Using a third mode at at least one wavelength may further increase the capacity of an optical communication system incorporating the network element.

In an embodiment, the method comprises generating and transmitting a third optical signal at each of the plurality of wavelengths. The third optical signals have the third propagation mode. Using the third mode at each wavelength may further increase the capacity of an optical communication system incorporating the network element.

In an embodiment, the optical communication system is a fibre access optical communication system. In an embodiment, the optical communication system is a passive optical network.

In an embodiment, the first optical signal is a downstream optical signal and the second optical signal is an upstream optical signal. In an embodiment, the third optical signal is a broadcast channel. This may enable a single wavelength to be used for downstream communication, upstream communication and a broadcast channel, thereby increasing the capacity of an optical communication system incorporating the network element as compared to known optical communication systems employing wavelength re-use.

In an embodiment, the optical communication system is a mobile backhaul optical communication system.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of bidirectional communication in an optical communication system.

In an embodiment, the data carrier is a non-transitory data carrier.

A fifth aspect of the invention provides a data carrier having computer readable instructions embodied therein. The said computer readable instructions are for providing access to resources available on a processor. The computer readable instructions comprise instructions to cause the processor to perform any of the above steps of the method of operating a network element in an optical communication system.

In an embodiment, the data carrier is a non-transitory data carrier.

Embodiments of the invention will now be described, by way of example only, with reference to the accompanying drawings.

DETAILED DESCRIPTION

Figure 1:
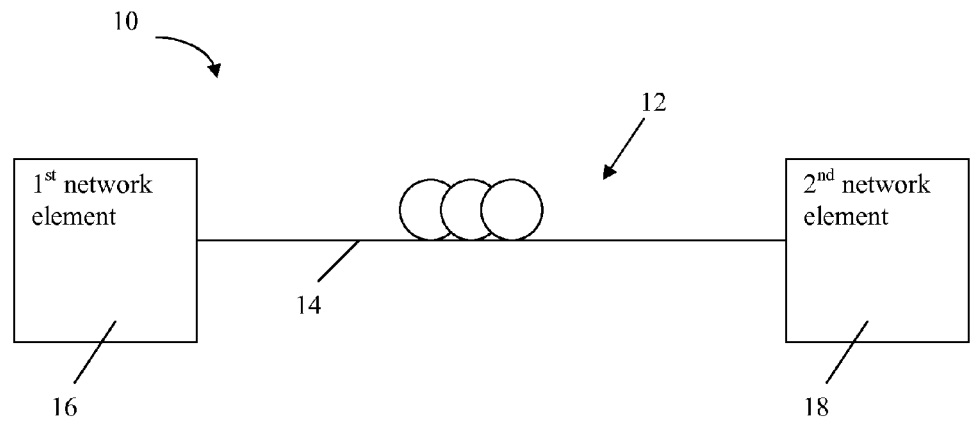
FIG. 1 is a schematic representation of a communication system according to a first embodiment of the invention.

Referring to FIG. 1, a first embodiment of the invention provides an optical communication system 10 comprising an optical link 12, a first network element 16 and a second network element 18.

The optical link 12 comprises an optical fibre 14. The first network element 16 is coupled to a first end of the optical link. The second network element 18 is coupled to a second end of the optical link. It will be understood by the person skilled in the art that coupled to may mean directly optically connected to or may mean optically connected to through an optical apparatus.

The first network element 16 is configured to generate a first optical signal for transmission to the second network element 18. The first optical signal has a first propagation mode corresponding to a first guided mode of the optical fibre 14. The second network element is configured to generate a second optical signal for transmission to the first network element. The second optical signal has a second propagation mode, different to the first propagation mode, corresponding to a second guided mode of the optical fibre.

Propagation mode is used here to refer to the mode of an optical signal and guided mode is used here to refer to a propagation mode which is guided in an optical fibre.

A second embodiment of the invention provides an optical communication system which is similar to the optical communication system 10 of FIG. 1 and will be described with reference to FIG. 1.

In this embodiment, the first network element 16 is configured to generate a first optical signal having a first wavelength and the second network element 18 is configured to generate a second optical signal at the first wavelength. The optical communication system of this embodiment therefore employs wavelength reuse combined with mode division multiplexing, MDM; the optical signals in the two directions of propagation have the same wavelength but each has a different propagation mode.

Figure 2:
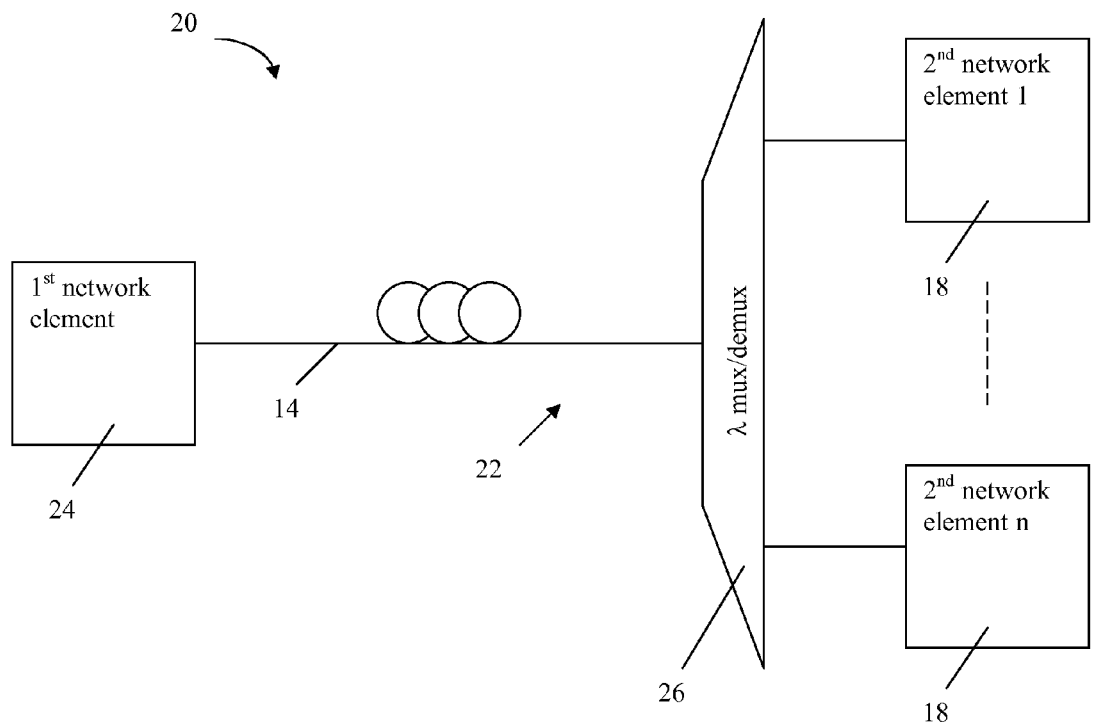
FIG. 2 is a schematic representation of a communication system according to a third embodiment of the invention.

A third embodiment of the invention provides an optical communication system 20 as shown in FIG. 2. The optical communication system 20 of this embodiment is similar to the optical communication system 10 of FIG. 1 with the following modifications. The same reference numbers are retained for corresponding features.

In this embodiment, the optical communication system comprises a plurality of second network elements 18 each coupled to the second end of the optical link 12. The optical link 22 comprises a wavelength division multiplexer/demultiplexer 26 provided at the second end of the optical fibre 14, which couples the second network elements 18 to the optical fibre 14.

The first network element 24 is configured to generate first optical signals at each of a plurality of different wavelengths for transmission to respective ones of the second network elements. Each second network element 18 is configured to generate a respective second optical signal at a respective one of the wavelengths. At each wavelength the first optical signal and the second optical signal have different propagation modes, corresponding to different guided modes of the optical fibre 14.

The optical communication system 20 of this embodiment therefore employs wavelength reuse combined with wavelength division multiplexing, WDM, and MDM; each pair of first and second optical signals have the same wavelength but the optical signals in a pair have different propagation modes.

A fourth embodiment of the invention provides an optical communication system which is similar to the optical communication system 20 of FIG. 2 and will be described with reference to FIG. 2.

In this embodiment, the first network element 24 is configured to generate the first optical signals all having a first propagation mode, corresponding to a first guided mode of the optical fibre 14. Each second network element 18 is configured to generate a respective second optical signal having a second propagation mode, different to the first propagation mode, corresponding to a second guided mode of the fibre. Therefore each optical signal transmitted from the first network element 24 to the respective second network element 18 has the same, first, propagation mode and each optical signal transmitted from a second network element 18 to the first network element 24 has the same, second, propagation mode.

Figure 3:
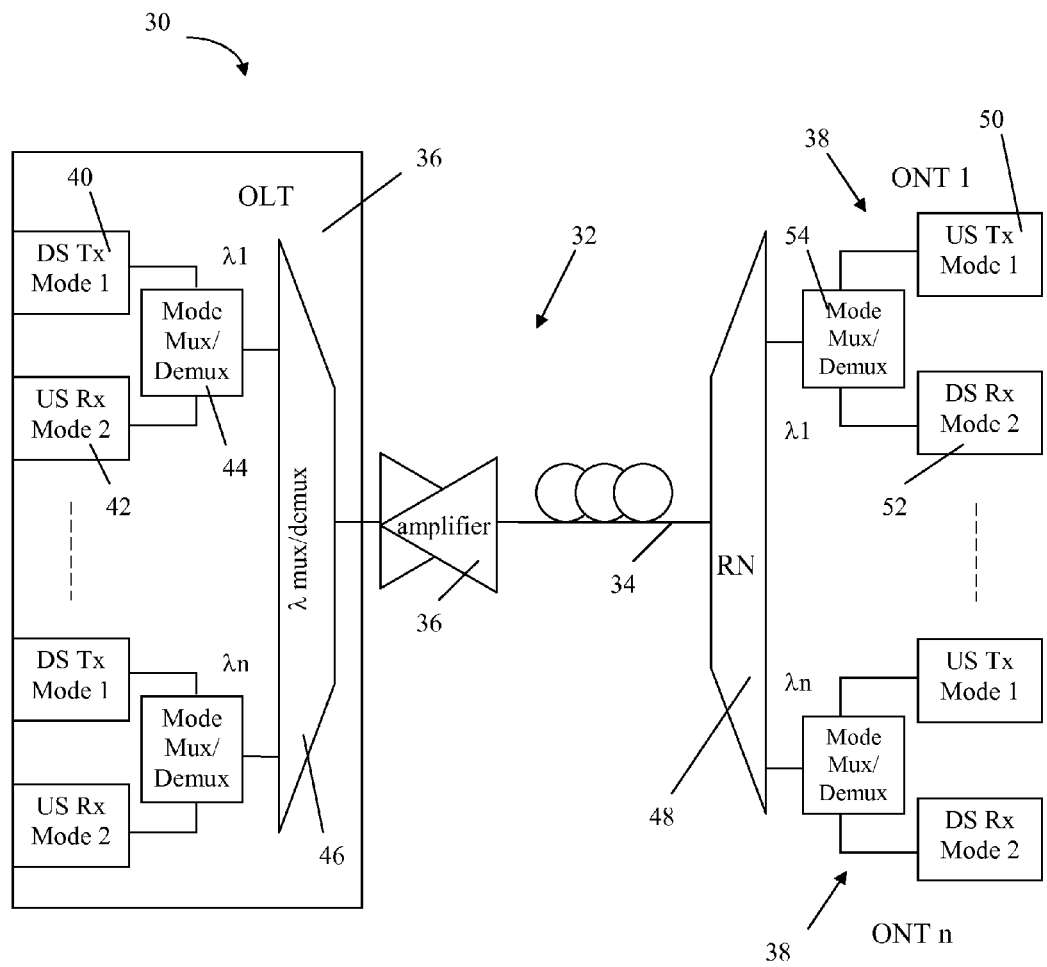
FIG. 3 is a schematic representation of a communication system according to a fifth embodiment of the invention.

FIG. 3 shows an optical communication system 30 according to a fifth embodiment of the invention. The optical communication system 30 of this embodiment is a fibre access system in the form of a passive optical network, PON.

The PON 30 comprises an optical link 32, a first network element, in the form of an optical line termination, OLT, 36, coupled to a first end of the optical link and a plurality of second network elements, each in the form of an optical network termination, ONT, 38, coupled to a second end of the optical link.

The optical link 32 comprises an optical fibre 34, a bi-directional optical amplifier 36 and a remote node, RN, 48 in the form of a wavelength division multiplexer/demultiplexer.

The OLT 36 is configured to generate first optical signals at each of a plurality of different wavelengths, $\lambda_1$ to $\lambda_n$, for transmission to respective ones of the ONTs 38. The OLT 36 comprises a downstream transmitter, DS Tx, 40, an upstream receiver, US Rx, 42 and a mode multiplexer/demultiplexer 44 for each of the plurality of wavelengths, $\lambda_1$ to $\lambda_n$. The OLT 36 additionally comprises a wavelength division multiplexer/demultiplexer 46 coupled between the mode mux/demux 44 and the optical link 32.

Each DS Tx 40 is configured to generate a respective first optical signal at a respective one of the wavelengths and having a first propagation mode, Mode 1. Each US Rx 42 is configured to receive a respective second optical signal at the respective wavelength and having a second propagation mode, Mode 2.

Each ONT 38 is configured to generate a respective second optical signal at a respective one of the wavelengths, $\lambda_1$ to $\lambda_n$. Each ONT 38 comprises an upstream transmitter, US Tx, 50, a downstream receiver, DS Rx, 52 and a mode multiplexer/demultiplexer 54. Each US Tx 50 is configured to generate a respective second optical signal at a respective one of the wavelengths and having the second propagation mode, Mode 2. Each DS Rx 52 is configured to receive a respective first optical signal at the respective wavelength and having the first propagation mode, Mode 1.

The optical fibre 34 is a few-mode fibre, FMF. An FMF is an optical fibre which is configured to support a limited number of modes at its working wavelength. An FMF has a core size which is larger than that of single mode fibre, SMF, and in this embodiment has a core size which configures the FMF to support 2 or 3 modes in either the optical communication C-band (1530-1565 nm) or L-band (1562-1625 nm). The modes are spatially distinct and can be used independently.

A sixth embodiment of the invention provides an optical communication system which is similar to the optical communication system 30 of FIG. 3 and will be described with reference to FIG. 3.

In this embodiment, the optical fibre 34 is an SMF. Each of the plurality of wavelengths is below the single-mode cut-off wavelength of the SMF, at which single-mode operation of the fibre 34 ceases and 2 or 3 guided modes are excited in the fibre at each wavelength.

Figure 4:
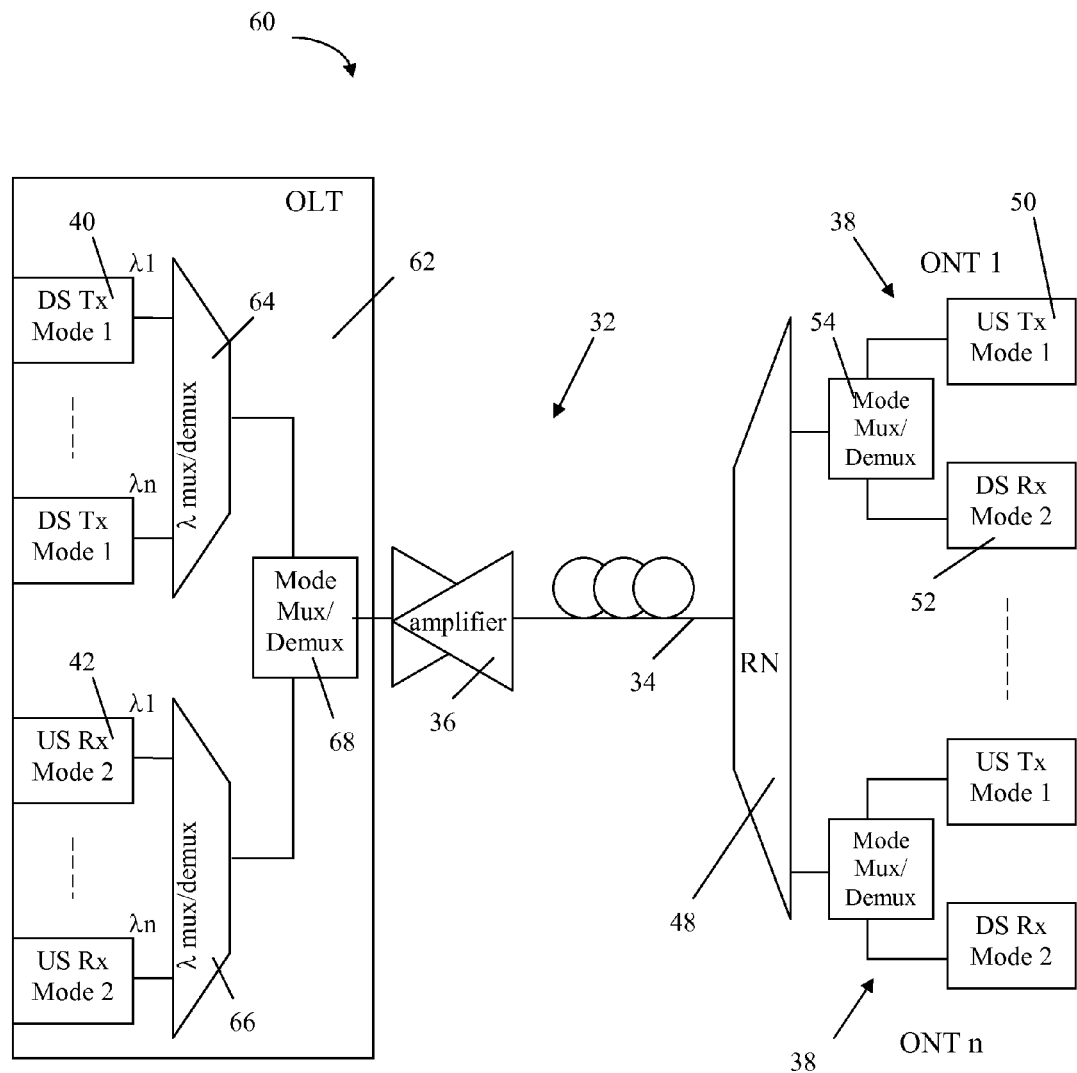
FIG. 4 is a schematic representation of a communication system according to a seventh embodiment of the invention.

An optical communication system 60 according to a seventh embodiment of the invention is shown in FIG. 4. The optical communication system 60 of this embodiment is similar to the optical communication system 30 of FIG. 3 with the following modifications. The same reference numbers are retained for corresponding features.

In this embodiment, the OLT 62 comprises a first wavelength division multiplexer/demultiplexer 64, a second wavelength division multiplexer/demultiplexer 66, and a single mode multiplexer/demultiplexer 68.

Each DS Tx 40 is coupled to the first wavelength mux/demux 64 and each US Rx 42 is coupled to the second wavelength mux/demux 64. The mode mux/demux 68 couples the first and second wavelength mux/demux to the optical link 32.

Figure 5:
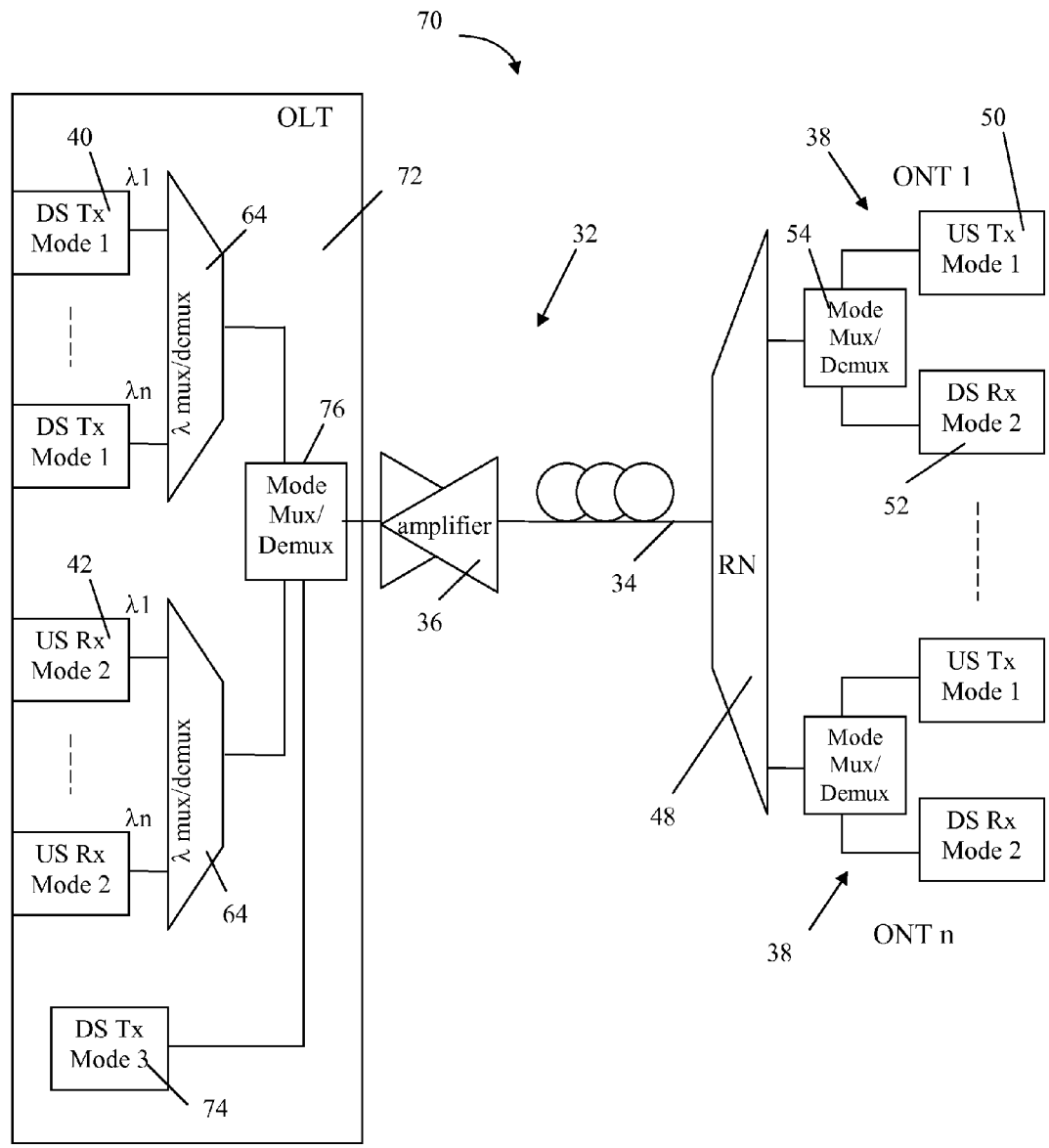
FIG. 5 is a schematic representation of a communication system according to an eighth embodiment of the invention.

An optical communication system 70 according to an eighth embodiment of the invention is shown in FIG. 5. The optical communication system 70 of this embodiment is similar to the optical communication system 60 of FIG. 4 with the following modifications. The same reference numbers are retained for corresponding features.

In this embodiment, the OLT 72 is configured to generate at least one third optical signal for transmission to a respective the ONT 38. The OLT 72 comprises downstream transmission apparatus, DS Tx, 74 configured to generate the third optical signal. The DS Tx 74 is coupled to the mode mux/demux 76. The third optical signal has a third propagation mode, different to the first and second propagation modes, corresponding to a third guided mode of the optical fibre 34.

In this embodiment, the OLT 72 is configured to generate at least one third optical signal at each of the plurality of wavelengths for transmission to respective ones of the ONTs 38. The OLT 72 comprises downstream transmission apparatus, DS Tx, 74 configured to generate the third optical signals. The DS Tx 74 is coupled to the mode mux/demux 76. The third optical signals have a third propagation mode, different to the first and second propagation modes, corresponding to a third guided mode of the optical fibre 34.

A ninth embodiment of the invention provides an optical communication system which has the same construction as the optical communication system 70 shown in FIG. 5, with the following modification.

In this embodiment, the OLT 72 is configured to generate a third optical signal at each of the plurality of wavelengths for transmission to respective ones of the ONTs 38. The DS Tx 74 is configured to generate the third optical signals. The third optical signals each have the third propagation mode.

The third optical signals form a broadcast channel by which transmits the same communications traffic to all of the ONTs, and may therefore be used to transmit the same information to all users on the system.

Figure 6:
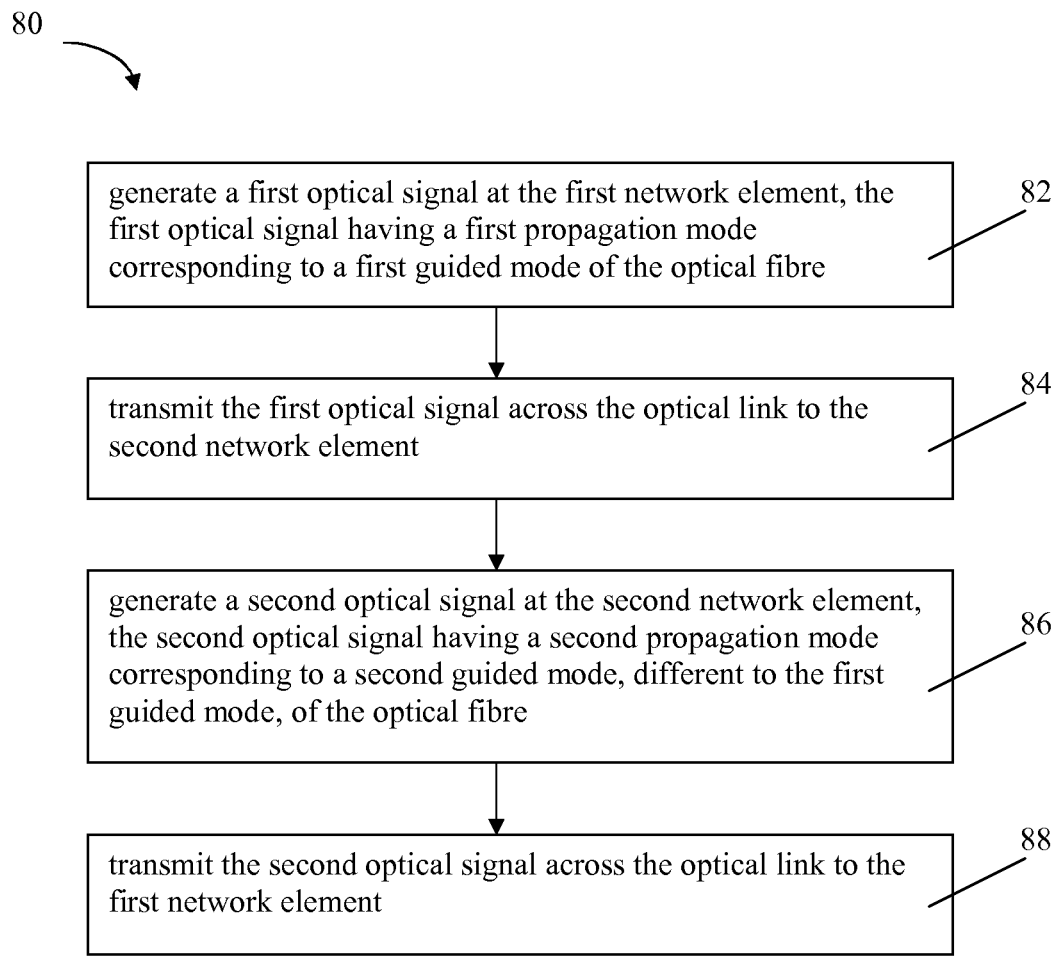
FIG. 6 shows the steps of a method according to a tenth embodiment of the invention of bidirectional communication in an optical communication system.

A tenth embodiment of the invention provides a method 80 of bidirectional communication in an optical communication system having the steps shown in FIG. 6.

The optical communication system comprises an optical link comprising an optical fibre, a first network element coupled to a first end of the optical link and a second network element coupled to a second end of the optical link.

The method comprises generating a first optical signal at the first network element 82 and transmitting the first optical signal across the optical link to the second network element 84. The first optical signal has a first propagation mode corresponding to a first guided mode of the optical fibre.

The method comprises generating a second optical signal at the second network element 86 and transmitting the second optical signal across the optical link to the first network element 88. The second optical signal has a second propagation mode, different to the first propagation mode, corresponding to a second guided mode of the optical fibre.

Figure 7:
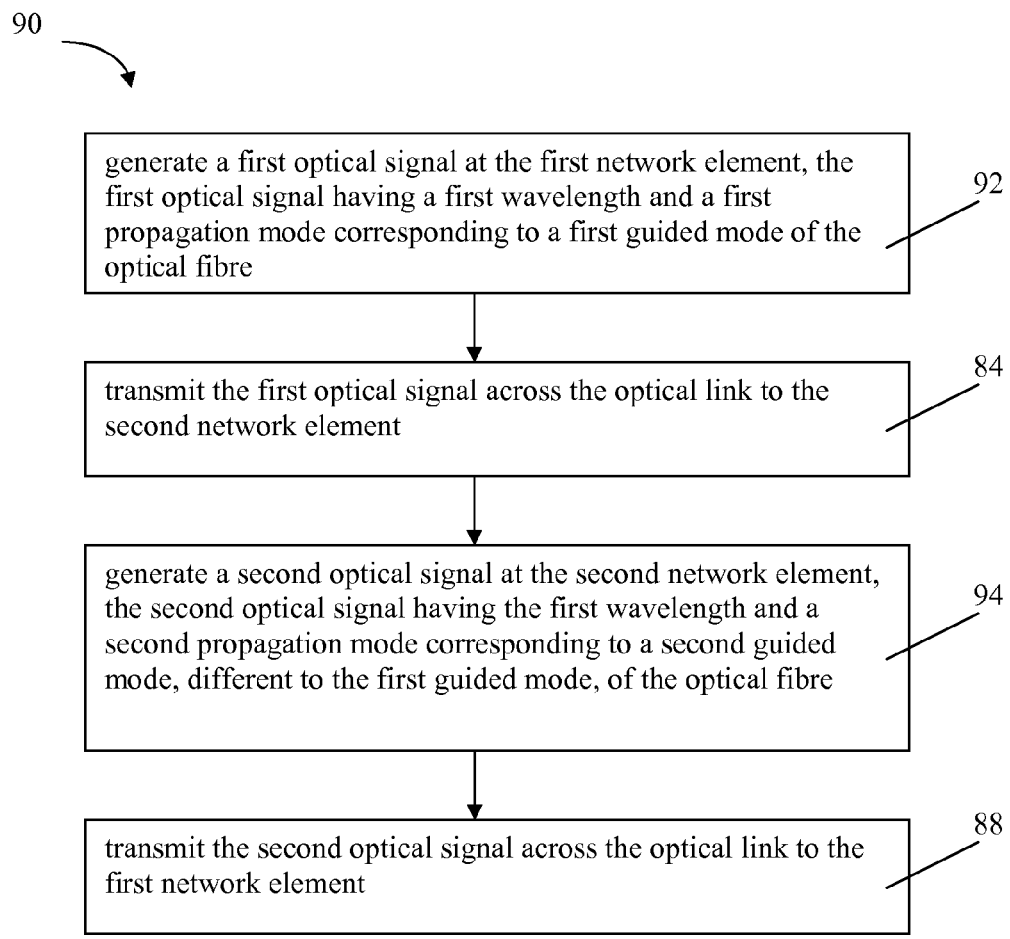
FIG. 7 shows the steps of a method according to an eleventh embodiment of the invention of bidirectional communication in an optical communication system.

An eleventh embodiment of the invention provides a method 90 of bidirectional communication in an optical communication system having the steps shown in FIG. 7. The method 90 of this embodiment is similar to the method 80 of FIG. 6, with the following modifications. The same reference numbers are retained for corresponding steps.

In this embodiment, the first and second optical signals are generated at the same, first, wavelength 92, 94.

Figure 8:
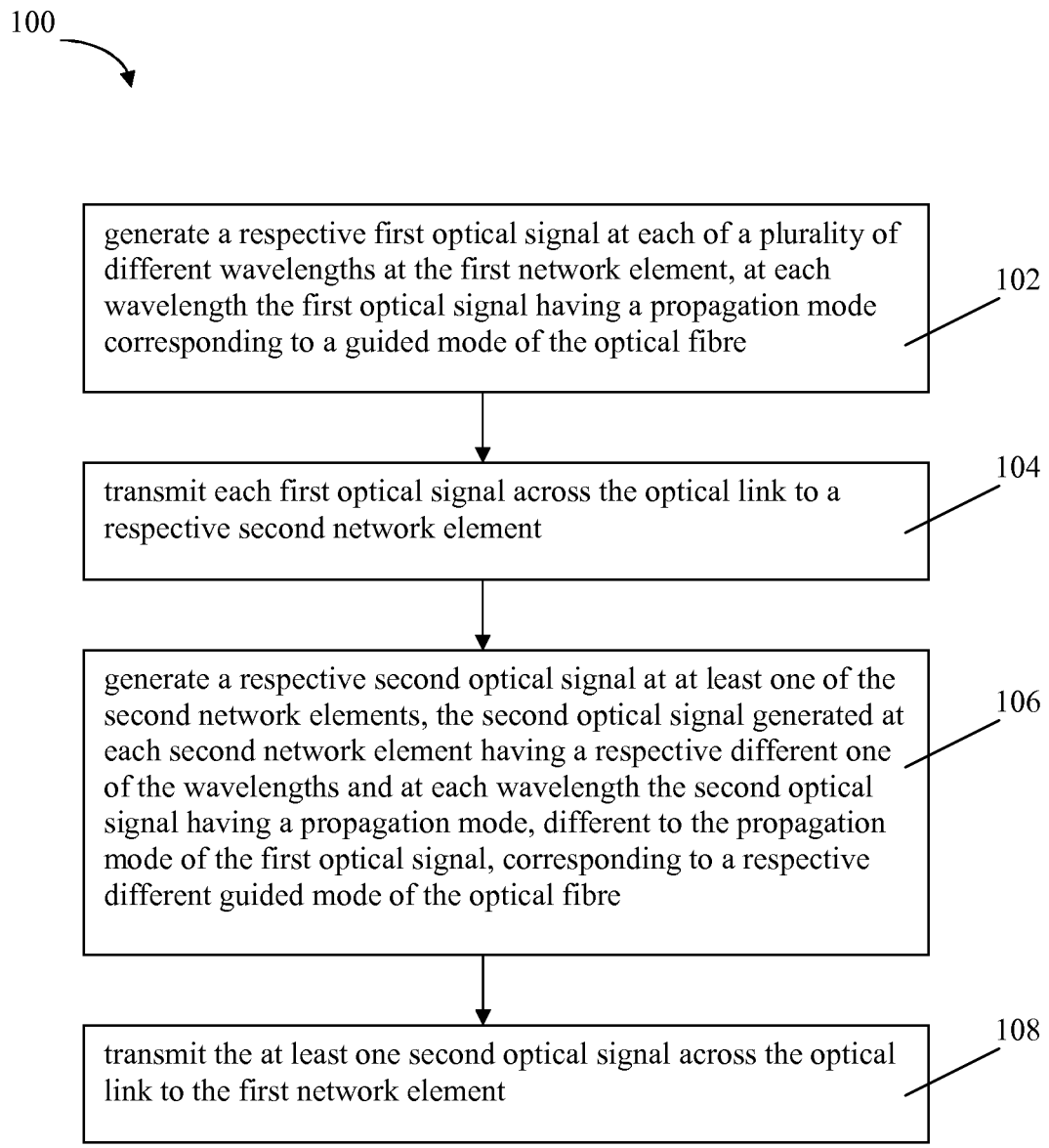
FIG. 8 shows the steps of a method according to a twelfth embodiment of the invention of bidirectional communication in an optical communication system.

A twelfth embodiment of the invention provides a method 100 of bidirectional communication in an optical communication system having the steps shown in FIG. 8.

The optical communication system comprises a plurality of second network elements each coupled to the second end of the optical link.

The method 100 comprises generating a first optical signal at each of a plurality of different wavelengths 102 and transmitting each first optical signal across the optical link to respective ones of the second network elements 104.

The method comprises generating a respective second optical signal at at least one of the second network elements 106 and transmitting the at least one second optical signal across the optical link to the first network element 108. The second optical signal generated at each second network element has a respective different one of the wavelengths. At each wavelength the first optical signal and the second optical signal have different propagation modes corresponding to respective different guided modes of the fibre.

Figure 9:
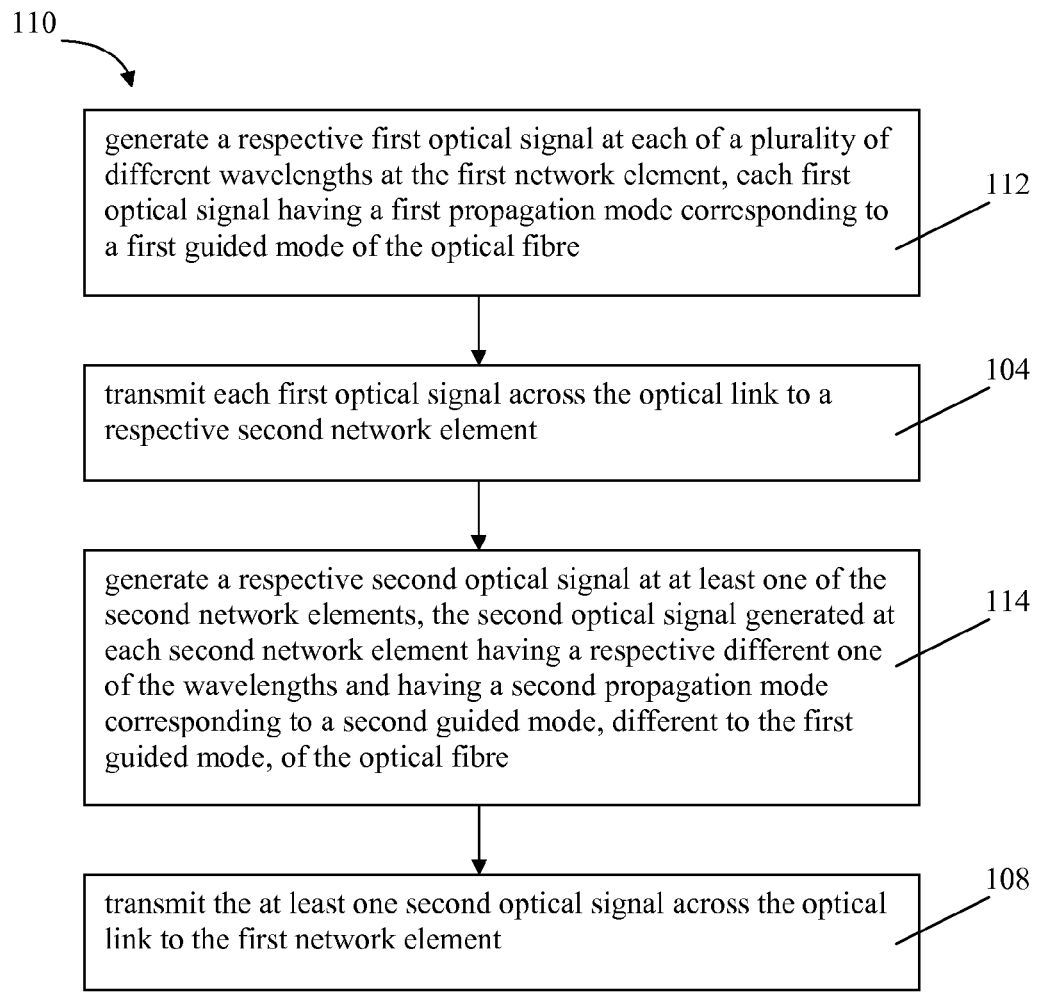
FIG. 9 shows the steps of a method according to a thirteenth embodiment of the invention of bidirectional communication in an optical communication system.

A thirteenth embodiment of the invention provides a method 110 of bidirectional communication in an optical communication system having the steps shown in FIG. 9. The method 110 of this embodiment is similar to the method 100 of FIG. 8, with the following modifications. The same reference numbers are retained for corresponding steps.

In this embodiment, the first optical signals each have a first propagation mode 112 and the second optical signals each have a second propagation mode 114, different to the first propagation mode.

Figure 10:
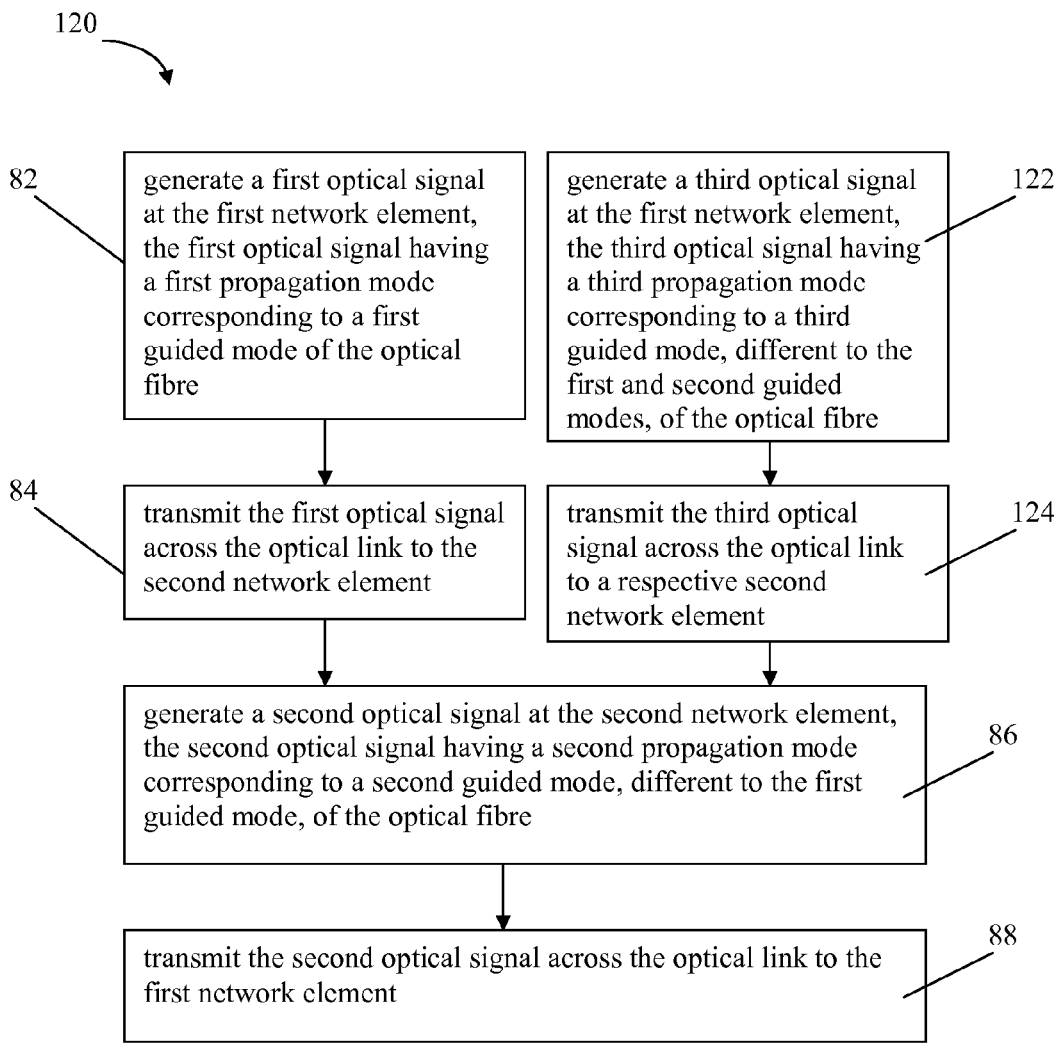
FIG. 10 shows the steps of a method according to a fourteenth embodiment of the invention of bidirectional communication in an optical communication system.

A fourteenth embodiment of the invention provides a method 120 of bidirectional communication in an optical communication system having the steps shown in FIG. 10. The method 120 of this embodiment is similar to the method 80 of FIG. 6, with the following modifications. The same reference numbers are retained for corresponding steps.

In this embodiment, the method comprises generating a third optical signal at the first network element 122 and transmitting the third optical signal to a respective second network element 124. The third optical signal has a third propagation mode, different to the first and second propagation modes, corresponding to a third guided mode of the optical fibre.

Figure 11:
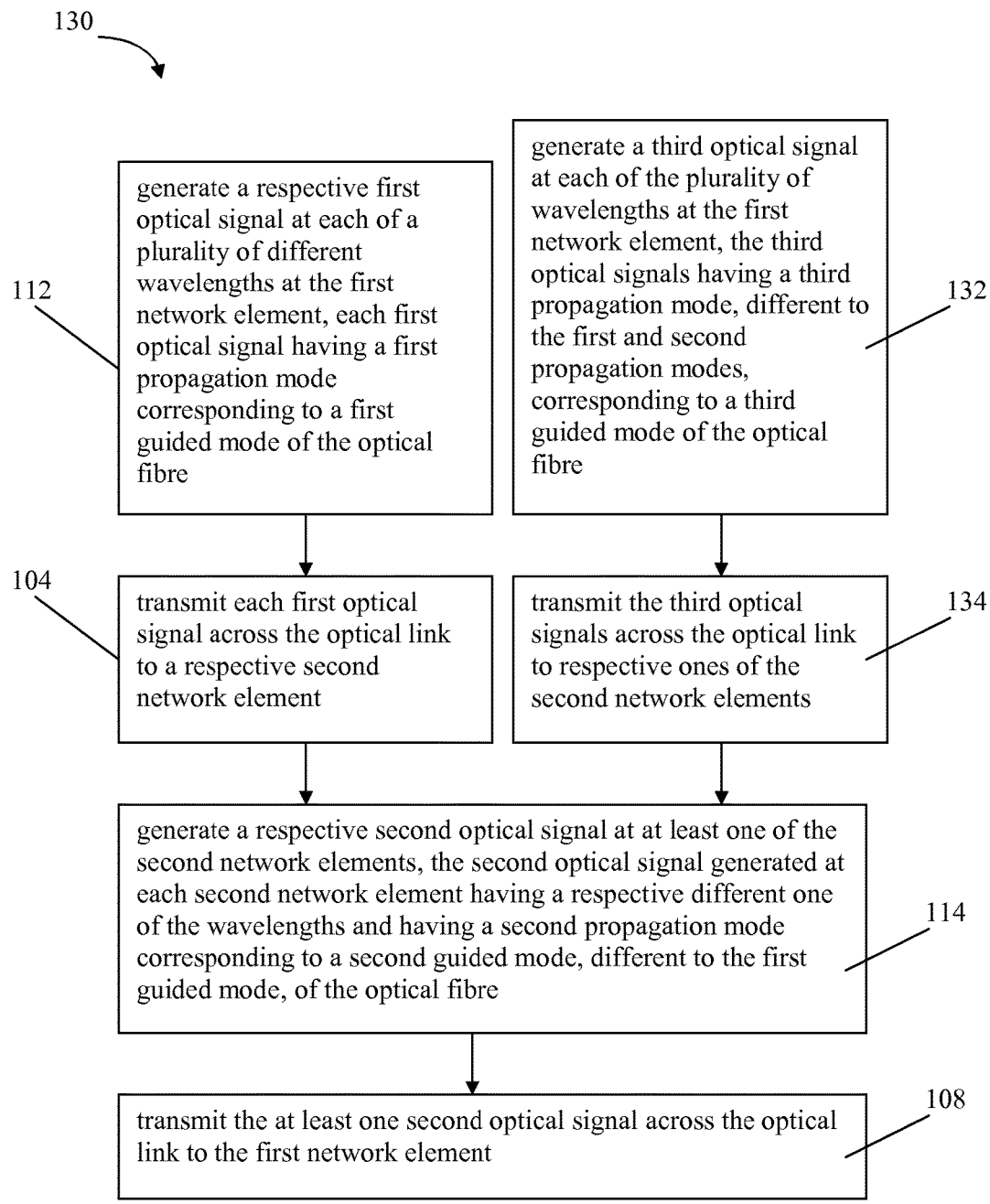
FIG. 11 shows the steps of a method according to a fifteenth embodiment of the invention of operating a network element in a communication system.

A fifteenth embodiment of the invention provides a method 130 of bidirectional communication in an optical communication system having the steps shown in FIG. 11. The method 130 of this embodiment is similar to the method 110 of FIG. 9, with the following modifications. The same reference numbers are retained for corresponding steps.

In this embodiment, the method comprises generating a third optical signal at each of a plurality of wavelengths at the first network element 132 and transmitting the third optical signals to respective ones of the second network elements 134. The third optical signals have a third propagation mode, different to the first and second propagation modes, corresponding to a third guided mode of the optical fibre.

Figure 12:
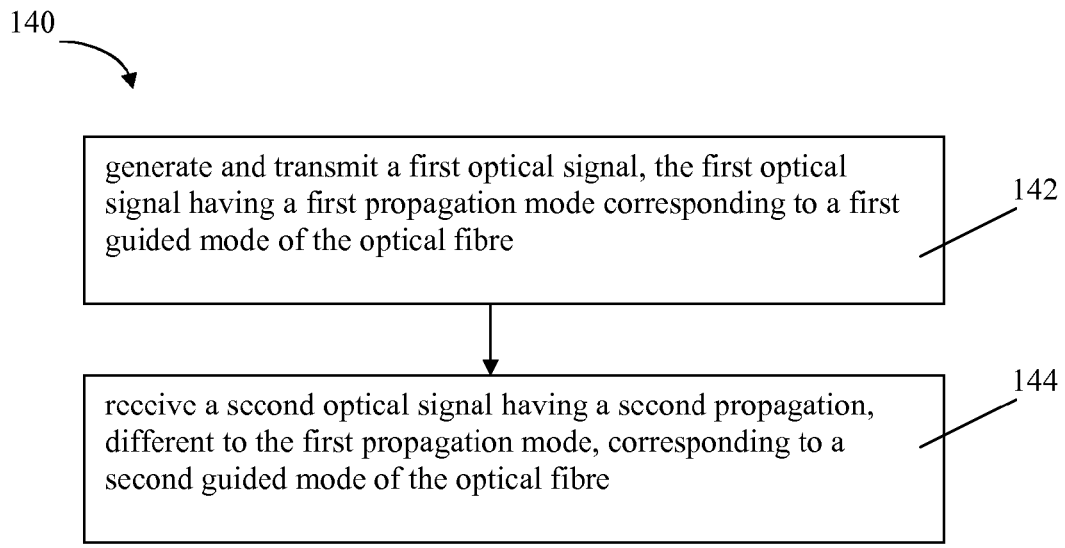
FIG. 12 shows the steps of a method according to a sixteenth embodiment of the invention of operating a network element in a communication system.

Referring to FIG. 12, a sixteenth embodiment of the invention provides a method 140 of operating a network element in an optical communication system. The optical communication system comprises an optical link comprising an optical fibre, a first network element coupled to a first end of the optical link and a second network element coupled to a second end of the optical link.

The method comprises generating and transmitting a first optical signal having a first propagation mode corresponding to a first guided mode of the optical fibre 142.

The method comprises receiving a second optical signal having a second propagation mode, different to the first propagation mode, corresponding to a second guided mode of the optical fibre 144.

Figure 13:
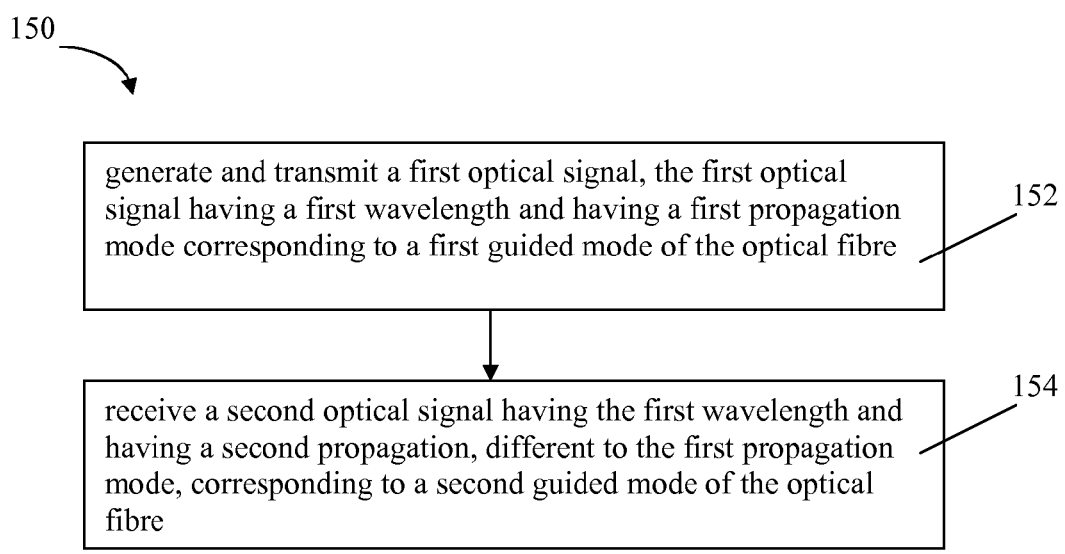
FIG. 13 shows the steps of a method according to a seventeenth embodiment of the invention of operating a network element in a communication system.

A seventeenth embodiment of the invention provides a method 150 of operating a network element in an optical communication system having the steps shown in FIG. 13. The optical communication system comprises an optical link comprising an optical fibre, a first network element coupled to a first end of the optical link and a second network element coupled to a second end of the optical link.

The method comprises generating and transmitting a first optical signal having a first wavelength and a first propagation mode corresponding to a first guided mode of the optical fibre 152.

The method comprises receiving a second optical signal having the first wavelength and having a second propagation mode, different to the first propagation mode, corresponding to a second guided mode of the optical fibre 154.

Figure 14:
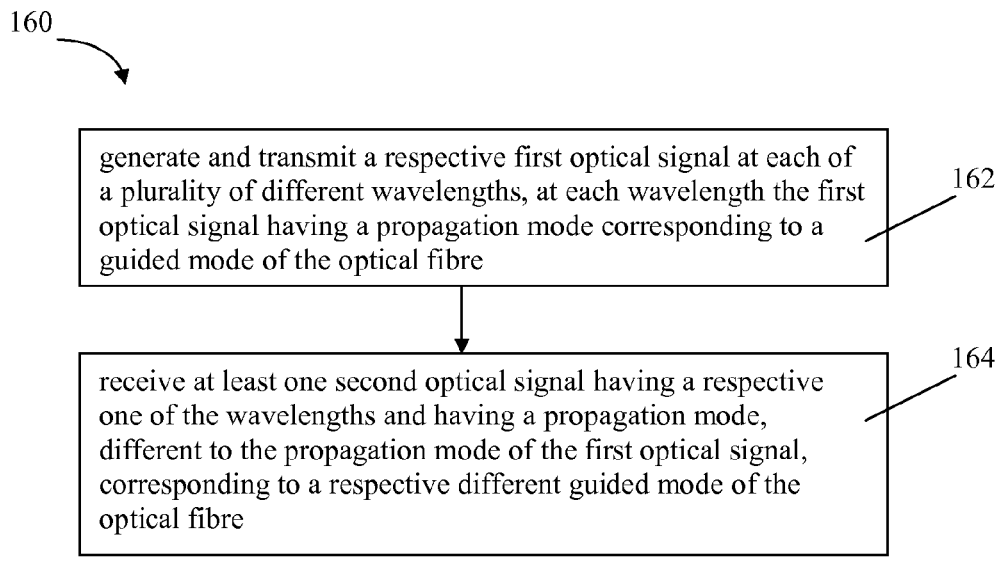
FIG. 14 shows the steps of a method according to an eighteenth embodiment of the invention of operating a network element in a communication system.

An eighteenth embodiment of the invention provides a method 160 of operating a network element in an optical communication system having the steps shown in FIG. 14. The optical communication system comprises an optical link comprising an optical fibre, a first network element coupled to a first end of the optical link and a plurality of second network elements each coupled to the second end of the optical link.

The method comprises generating and transmitting a first optical signal at each of a plurality of different wavelengths 162.

The method comprises receiving at least one second optical signal having a respective one of the wavelengths 164.

At each wavelength the first optical signal and the second optical signal have different propagation modes corresponding to respective different guided modes of the fibre.

Figure 15:
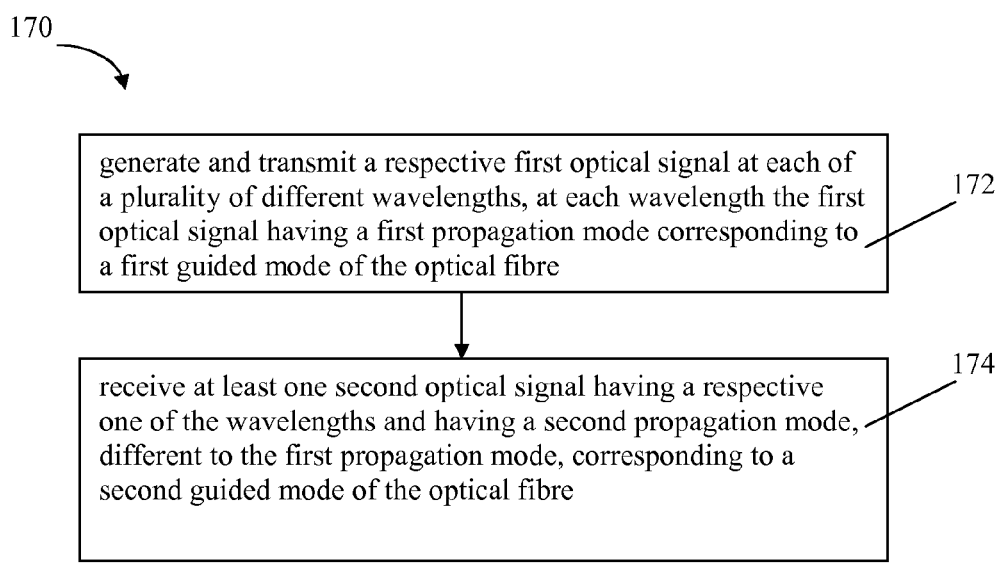
FIG. 15 shows the steps of a method according to a nineteenth embodiment of the invention of operating a network element in a communication system.

A nineteenth embodiment of the invention provides a method 170 of operating a network element in an optical communication system having the steps shown in FIG. 15. The method 170 of this embodiment is similar to the method 160 of FIG. 14, with the following modifications.

In this embodiment, the first optical signals each have the first propagation mode 172 and the at least one second optical signal has the second propagation mode 174.

A twentieth embodiment of the invention provides a data carrier having computer readable instructions embodied therein. The computer readable instructions are for providing access to resources available on a processor. The computer readable instructions comprise instructions to cause the processor to perform any of the steps of the method of bidirectional communication in an optical communication system as described above in any of the tenth to fifteenth embodiments.

A twenty-first embodiment of the invention provides a data carrier having computer readable instructions embodied therein. The computer readable instructions are for providing access to resources available on a processor. The computer readable instructions comprise instructions to cause the processor to perform any of the steps of the method of operating a network element in an optical communication system as described above in any of the sixteenth to nineteenth embodiments.

The invention claimed is:

1. An optical communication system comprising:
an optical link comprising an optical fibre;
a first network element coupled to a first end of the optical link; and
a second network element coupled to a second end of the optical link,
wherein the first network element is configured to generate a first optical signal for transmission to the second network element, the first optical signal having a first propagation mode corresponding to a first guided mode of the optical fibre, and the second network element is configured to generate a second optical signal for transmission to the first network element, the second optical signal having a second propagation mode, different to the first propagation mode,
corresponding to a second guided mode of the optical fibre.

2. An optical communication system as claimed in claim 1, wherein the first optical signal and the second optical signal have a first wavelength.

3. An optical communication system as claimed in claim 2, wherein the optical fibre is a single-mode fibre and each wavelength is below a cut-off wavelength of the single-mode fibre such that 2 or 3 guided modes are excited within the single-mode fibre at each wavelength.

4. An optical communication system as claimed in claim 1, wherein the optical communication system comprises a plurality of said second network elements each coupled to the second end of the optical link, and wherein the first network element is configured to generate first optical signals at each of a plurality of different wavelengths for transmission to respective ones of the second network elements and each second network element is configured to generate a respective second optical signal at a respective one of the wavelengths, and wherein at each wavelength the first optical signal and the second optical signal have different propagation modes.

5. An optical communication system as claimed in claim 4, wherein the first optical signals each have a first propagation mode and the second optical signals each have a second propagation mode, different to the first propagation mode.

6. An optical communication system as claimed in claim 1, wherein the first network element is configured to generate at least one third optical signal for transmission to at least one second network element, the third optical signal having a third propagation mode, different to the first and second propagation modes, corresponding to a third guided mode of the optical fibre.

7. An optical communication system as claimed in claim 6, wherein the first network element is configured to generate a third optical signal at each of the plurality of wavelengths for transmission to respective ones of the second network elements, the third optical signals having the third propagation mode.

8. An optical communication system as claimed in claim 1, wherein the optical fibre is a few-mode fibre.

9. A method of bidirectional communication in an optical communication system comprising an optical link comprising an optical fibre, a first network element coupled to a first end of the optical link and a second network element coupled to a second end of the optical link, the method comprising:
generating a first optical signal at the first network element and transmitting the first optical signal across the optical link to the second network element, the first optical signal having a first propagation mode corresponding to a first guided mode of the optical fibre; and
generating a second optical signal at the second network element and transmitting the second optical signal across the optical link to the first network element, the second optical signal having a second propagation mode, different to the first propagation mode, corresponding to a second guided mode of the optical fibre.

10. A method as claimed in claim 9, wherein the first optical signal and the second optical signal have a first wavelength.

11. A method as claimed in claim 9, wherein the optical communication system comprises a plurality of second network elements each coupled to the second end of the optical link, and the method comprises:
   generating a first optical signal at each of a plurality of different wavelengths and transmitting each first optical signal across the optical link to respective ones of the second network elements; and
   generating a respective second optical signal at at least one of the second network elements and transmitting the at least one second optical signal across the optical link to the first network element, the second optical signal generated at each second network element having a respective different one of the wavelengths,
   wherein at each wavelength the first optical signal and the second optical signal have different propagation modes corresponding to respective different guided modes of the fibre.

12. A method as claimed in claim 11, wherein the first optical signals each have a first propagation mode and the second optical signals each have a second propagation mode, different to the first propagation mode.

13. A method as claimed in claim 9, wherein the method comprises generating at least one third optical signal at the first network element and transmitting the third optical signal to a respective second network element, the third optical signal having a third propagation mode, different to the first and second propagation modes, corresponding to a third guided mode of the optical fibre.

14. A method as claimed in claim 13, wherein the method comprises generating a third optical signal at each of the plurality of wavelengths at the first network element and transmitting the third optical signals to respective ones of the second network elements, the third optical signals having the third propagation mode.

15. A method of operating a network element in an optical communication system comprising an optical link comprising an optical fibre, a first network element coupled to a first end of the optical link and a second network element coupled to a second end of the optical link, the method comprising:
   generating and transmitting a first optical signal having a first propagation mode corresponding to a first guided mode of the optical fibre; and
   receiving a second optical signal having a second propagation mode, different to the first propagation mode, corresponding to a second guided mode of the optical fibre.

16. A method as claimed in claim 15, wherein the first optical signal and the second optical signal have a first wavelength.

17. A method as claimed in claim 15, wherein the optical communication system comprises a plurality of second network elements each coupled to the second end of the optical link, and the method comprises:
   generating and transmitting a first optical signal at each of a plurality of different wavelengths; and
   receiving at least one second optical signal having a respective one of the wavelengths,
   wherein at each wavelength the first optical signal and the second optical signal have different propagation modes corresponding to respective different guided modes of the fibre.

18. A method as claimed in claim 17, wherein the first optical signals each have the first propagation mode and the at least one second optical signal has the second propagation mode.

* * * * *